United States Patent [19]

Gillot

[11] Patent Number: 4,698,157

[45] Date of Patent: Oct. 6, 1987

[54] FILTER MEMBRANE AND METHOD OF MANUFACTURING IT

[75] Inventor: Jacques Gillot, Odos, France

[73] Assignee: Ceraver, S.A., Paris, France

[21] Appl. No.: 763,305

[22] Filed: Aug. 5, 1985

Related U.S. Application Data

[63] Continuation of Ser. No. 487,680, Apr. 22, 1983, abandoned.

[30] Foreign Application Priority Data

Apr. 28, 1982 [FR] France ................................. 82 07298

[51] Int. Cl.$^4$ ............................................. B01D 13/00
[52] U.S. Cl. ................... 210/496; 210/510.1; 264/43
[58] Field of Search .................. 210/496, 510.1, 490, 210/491; 264/43, 49; 55/523; 427/244

[56] References Cited

U.S. PATENT DOCUMENTS

| | | | |
|---|---|---|---|
| 3,824,112 | 2/1968 | Lawrence et al. | 264/43 X |
| 4,356,215 | 10/1982 | Auriol et al. | 55/523 X |

FOREIGN PATENT DOCUMENTS

| | | | |
|---|---|---|---|
| 1072543 | 12/1959 | Fed. Rep. of Germany | 210/496 |
| 817607 | 8/1959 | United Kingdom | 55/523 |
| 1358501 | 7/1974 | United Kingdom | 210/496 |

*Primary Examiner*—Frank Spear
*Attorney, Agent, or Firm*—Kenyon and Kenyon

[57] ABSTRACT

A filter membrane for filtering liquid food stuffs or hot gases and including at least one filter layer. The membrane is constituted by a sintered inorganic material comprising grains which are fixedly connected to one another and the average roughness of the surface of said filter layer over a distance along said surface equal to at least five times the average grain size is less than one fifth of the average grain size in the region in question.

5 Claims, No Drawings

FILTER MEMBRANE AND METHOD OF MANUFACTURING IT

This application is a continuation of application Ser. No. 487,680, filed Apr. 22, 1983, now abandoned.

The present invention relates to a filter membrane constituted by a sintered inorganic material including at least one fine-pored surface layer acting as the filter layer.

BACKGROUND OF THE INVENTION

Currently known membranes of this type have a surface which generally includes irregularities in the form of depressions and projections on a microscopic scale which lead to the following drawbacks:

(1) when using the membrane in direct filter mode, the interface between the membrane and the filter cake is irregular in shape and thus makes it more difficult to clean the surface of the filter when unclogging it; and (2) when using the membrane in tangential filter mode, the tangential flow which is intended to prevent a filter cake from forming by washing away particles which are stopped at the pore inlets, is incapable of washing away particles trapped at pore inlets which are situated in the bottoms of depressions. Further, the particles being washed away tangentially are washed up against surface projections, thereby building up collections of particles on the upstream side of such projections and thus beginning the formation of a filter cake.

The depressions and projections on the surface of the membrane thus reduce the overall permeability of the membrane and make it necessary to unclog the membrane more frequently, thereby complicating the use of the filter.

Preferred implementations of the present invention mitigate these drawbacks by providing a filter membrane which clogs up relatively slowly, which can be quickly and easily unclogged, eg. by applying reverse pressure, and which can be used for filtration or ultrafiltration of very hot and/or corrosive liquids or gases.

SUMMARY OF THE INVENTION

The present invention provides a filter membrane including at least one filter layer and constituted by a sintered inorganic material comprising grains which are fixedly connected to one another, the improvement wherein the average roughness of the surface of said filter layer over a distance along said surface equal to at least five times the average grain size is less than one fifth of the average grain size in the region in question.

Advantageously the roughness is less than one tenth of the average grain size.

In one implementation of the invention, at least 90% by weight of the grains in the surface layer are less than twice the average grain size, and at least 90% by weight of said grains are more than half the average grain size.

The porosity of the filter layer may be in the range 30% to 40% by volume.

The filter layer may be deposited on a support layer which has greater porosity and which may be constituted by several sub-layers of different porosity.

All the layers and sub-layers are made of grains which are fixedly connected to one another, and the various layers and sub-layers are also fixedly connected to one another.

The filter layer and the support layer are advantageously of the same nature, and may be constituted by at least one material chosen from the group constituted by metal oxides, silicon carbide, silicon nitride, silicon and aluminium oxynitrides (SiALON), borides, and glasses.

The material may thus be alumina which is at least 99.9% pure.

The invention also provides a method of manufacturing a filter membrane, in particular where the surface filter layer is supported on a support layer. In accordance with the invention, the method comprises preparing a slip comprising fine grains of the inorganic material which is to constitute the filter layer, together with a dispersing agent so as to obtain a thoroughly deflocculated suspension of fine grains, the slip is then applied to the support layer, excess slip is removed and the deposited thin layer is dried. Then the support layer with the thin layer it is supporting are baked at a temperature suitable for sintering the grains of the inorganic material.

Optionally there may be an intermediate step of filtering the slip through the support layer after it has been apppplied thereto, and before baking.

Advantageously, an organic thickening agent may be added to the slip provided that it does not hinder deflocculation.

Further, before the slip is applied to the support layer, it may advantageously be subjected to prolonged grinding in order to break up any agglomerations of particles and to ensure that the particles are thoroughly dispersed throughout the suspension.

It is convenient to measure surface roughness over a distance equal to at least five times the average grain size.

Measurements performed over shorter distances would not be statistically significant since they would take too few grains into account.

However, there is no point in measuring surface roughness over too long a distance. In such cases the measured value of roughness would include not only local projections and depressions due to grains which are irregularly placed relative to one another, and therefore a hinderance to good filtering, but also gently sloping surface undulations which have no deleterious effects on filtering.

Thus measurements over a distance of five to fifteen times the average grain size give satisfactory values of surface roughness.

Grain size is defined as being the average diameter of a sphere of same density as the grain which, when placed in a liquid, would sediment at the same speed as the grain in question. This is the definition used in well known particle size measuring apparatus using the sedimentation method, and it is the method which was used to determine the grain sizes specified in the examples.

The average size of a set of grains is designated below as $D_{50}$ and is the size such that 50% by weight of the grains in the set are larger than $D_{50}$ leaving 50% by weight which are smaller than $D_{50}$.

The average roughness of the membrane surface is defined as follows:

An X axis is taken to run parallel to the average surface of the membrane (on the side facing the fluid to be filtered) and a Y axis is taken perpendicular thereto such that $y=f(x)$ defines the height of the surface above or below the average surface. The average height is defined as h, where:

$$h = (1/L) \int_0^L f(x) \cdot dx$$

The average roughness is then defined as $R_a$ where:

$$R_a = (1/L) \int_0^L |f(x) - h| dx$$

When performing roughness measurements with a roughness meter, a signal from a detector is filtered so as to take into account only high frequencies corresponding to variations in height over a short distance. Any given cut-off frequency of the filter corresponds to a particular length (in microns) along the surface over which the instrument is measuring. By using a high cut-off frequency corresponding to a length which is greater than five average size grains but not greater than about fifteen average size grains, the roughness measurement only takes account of variations in height equal to one or a few grains. If a low cut-off frequency is used, the measured roughness combines grain-sized variations in height together with larger surface undulations.

Using a cut-off frequency which corresponds to a length which is longer than five average grain sizes, the average roughness $R_a$ of a filter membrane in accordance with the invention is such that:

$R_a < 0.02 D_{50}$ and preferably:

$R_a < 0.10 D_{50}$

When the filter layer is a distinct layer different from the support layer, the pore diameter may lie in the range 0.01 microns to 20 microns, with the average grain size lying in the range 0.02 microns to 50 microns.

In the support layer, the pore diameter may lie in the range 2 to 50 microns, with the average grain size lying in the range 5 to 200 microns.

MORE DETAILED DESCRIPTION

There follows a description given by way of example of filter membranes in accordance with the invention, together with their methods of manufacture. Rough membranes are also described by way of comparison.

A membrane in accordance with the invention may be constituted as follows:
 a support layer comprising a first sub-layer which is 1.5 to 2 mm thick and which has pores of average size in the range 10 to 20 microns; and a second sub-layer which is about 20 microns thick and which has pore of average size in the range 1 to 3 microns;
 said support layer is advantageously in the form of a tube with an inside diameter of 7 to 15 mm for example and with the second sub-layer on its inside surface; and
 a filter layer on the second sub-layer, the filter layer being 10 to 20 microns thick and having an average pore size in the range 0.2 to 0.8 microns.

The various layers are preferably 30% to 40% porous by volume.

The membrane is preferably made of sintered inorganic material as indicated above, but it could alternatively be made of carbon prepared by baking carbon grains which have been agglomerated by an organic binder.

The membrane is generally in the form of a bundle of tubes, with the layer of finest porosity being on the inside of each tube, however a plane membrane may also be made.

The membranes are made from metal oxide grains by preparing a thoroughly deflocculated slip of oxide particles whose grain sizes have small dispersion. With the average particle size as measured by sedimentation designated $D_{50}$, at least 90% by weight of the particles are less than twice $D_{50}$, and 90% by weight of the particles are greater than half $D_{50}$. In preparing the slip, any dispersing agent or other additive which ensures a high degree of deflocculation may be used; the important thing is for each particle to be in suspension in isolation from the other particles, ie. for there to be no, or at least very few, agglomerations of several particles. The suspension must be sufficiently viscous to prevent the particles sedimenting too rapidly. For this purpose a thickening agent is added to the slip, taking care to avoid agents which may have a deleterious effect on the deflocculation. The slip must sediment in the form of a dense sediment constituted by a compact heap of particles. A large proportion (at least 40%) is constituted by the particles with the remainder being constituted by the volume of liquid in between the particles. It is thus necessary to choose a thickening agent which, in conjunction with the wetting agent, makes it possible to obtain a dense sediment at least 40% of which is constituted by particles. Thickening agents which prevent this from happening must be avoided.

The slip is applied to the surface of the membrane which is to receive the smooth surface layer in such a manner as to leave a uniform film of slip on said surface.

The slip deposit is dried and then baked to sinter the particles so that they weld together and so that the layer which they constitute is also welded to the layer on which it is deposited.

Instead of merely applying the deflocculated slip to the surface of the membrane, a smooth surface layer may also be obtained by filtering the slip through the membrane so that the liquid passes through the membrane leaving the particles which were in suspension trapped at the first porous layer of the membrane through which they could not pass.

There follow some specific examples of preparing membranes in accordance with the invention.

EXAMPLE 1

A two layer tubular membrane is prepared using the method described in published French patent application No. 2 463 636. Tubes are thus obtained having a first, or support, layer which is 1.5 mm thick with an average pore diameter of 15 microns, and a second layer on the inside surface of the tube which is 20 to 30 microns thick with an average pore diameter of 1 micron.

The following steps are performed to deposit a smooth third layer having an average pore diameter of 0.26 microns on said second layer:

(1) a slip is prepared having the following composition:

(1.1) 8% by weight alumina particles with an average grain size (as measured after grinding) of 0.55 microns.

(1.2) 91.84% by weight water with polyethylene glycol (Union Carbide's Carbowax 4000C) added to obtain a viscosity of 5 poises.

(1.3) 0.16% by weight Polyplastic's DARVAN C dispersing agent.

(2) the slip is ground for 24 hours in a 25 liter ball grinder for the purpose of breaking up any grain agglomerations and to thoroughly disperse the particles. The grinder contains:

(2.1) 25 kg of 10 mm diameter alumina balls.

(2.2) 7 liters of slip.

(3) The tube is filled with the slip after grinding and allowed to empty under gravity. A film of slip remains on the inside surface of the tube. This film is dried and then baked under an oxidizing atmosphere at 1300° C. to form a layer which is 20 to 30 microns thick with an average pore diameter of 0.26 microns and a substantially smooth surface, whose degree of roughness is given in a table below.

Membranes have also been prepared using the same procedure except that the polyethylene glycol (Carbowax 4000) in the slip was replaced with ethylhydroxyethylcellulose (Bermocoll) and that no dispersing agent was added. These membranes have a rough surface, with a degree of roughness given in the table below.

EXAMPLE 2

A single layer tubular membrane is prepared using the method described in published French patent application No. 2 463 636, and stopping once the support tube thus obtained is 2 mm thick with an average pore diameter of 15 microns, The following steps are performed to deposit a smooth layer on the inside of the tube having an average pore diameter of 1.9 microns:

(1) a slip having the same composition as in Example 1 is prepared, except that the average grain size of the alumina is 1.2 microns after grinding.

(2) the slip is ground in the same manner as in Example 1.

(3) The tube is filled with the slip after grinding and is allowed to empty under gravity. A film of slip remains on the inside surface of the tube. This film is dried and then baked under an oxidizing atmosphere at about 1500° C. to form a layer which is 20 to 30 microns thick with an average pore diameter of 1.8 microns and a substantially smooth surface, whose degree of roughness is given in a table below.

Membranes have also been prepared using the same procedure except that the polyethylene glycol (Carbowax 4000) in the slip was replaced with ethylhydroxyethylcellulose (Bermocoll) and that no wetting agent was added. These membranes have a rough surface, with a degree of roughness given in the table below.

EXAMPLE 3

Similar to Example 2, but the starting product has alumina particles of 1.6 microns average size, and baking takes place at about 1550° C. The average pore size is 2 microns when wetting agent is used and 1.8 microns when wetting agent is not used.

The following table applies to the smooth and the rough membranes obtained in Examples 1 to 3, and for each membrane it gives the average grain size $D_{50}$, the average pore size (ie. the average diameter of the pores) the word "rough" or "smooth", the distance d over which the roughness measurement is performed (by suitably setting the cut-off frequency of the filter), the average roughness $R_a$, the ratio $R_a/D_{50}$, and the ratio $d/D_{50}$.

The roughness measurements were performed using a recording "Surfcom-1" roughness meter as manufactured by Tokyo Seimitsu Co. Ltd.

TABLE

| | (all linear dimensions expressed in microns) | | | | | |
|---|---|---|---|---|---|---|
| Membrane | $D_{50}$ | Average pore size | d | Roughness (ie. $R_a$) | $R_a/D_{50}$ | $d/D_{50}$ |
| EXAMPLE 1 | | | | | | |
| (a) Smooth | 0.55 | 0.26 | 8 | 0.05 | 0.09 | 14.5 |
| (b) Rough | 0.55 | 0.20 | 8 | 0.13 | 0.24 | 14.5 |
| EXAMPLE 2 | | | | | | |
| (a) Smooth | 1.20 | 1.8 | 8 | 0.14 | 0.12 | 6.7 |
| (b) Rough | 1.20 | 1.5 | 8 | 0.30 | 0.25 | 6.7 |
| EXAMPLE 3 | | | | | | |
| (a) Smooth | 1.6 | 2.0 | 8 | 0.24 | 0.15 | 5 |
| (b) Rough | 1.6 | 1.8 | 8 | 0.42 | 0.26 | 5 |

I claim:

1. A method of manufacturing a granular filter membrane having an average surface roughness measured over a distance equal to at least five times an average grain size of said membrane that is less than one fifth of said average grain size in the region in question, wherein the method comprises preparing a thin slip comprising a suspension in a liquid vehicle of fine grains of an inorganic material selected from the group consisting of metal oxides, silicon carbide, silicon nitride, silicon and aluminum oxynitrides (SiALON), borides, and glasses, together with a dispersing agent in an amount sufficient to obtain a thoroughly deflocculated suspension of fine grains, and a thickening agent which does not hinder deflocculation;

depositing the slip onto a porous support layer having pores of greater size than said filter layer;

draining off excess slip so as to leave a thin uniform layer on the support;

drying the deposited thin layer; and then baking the support layer with the thin layer it is supporting at a temperature suitable for sintering the grains of the inorganic material.

2. A method according to claim 1, including an intermediate step of filtering the slip through the support layer after it has been applied thereto, and before drying.

3. A method according to claim 1, wherein the slip is subjected to prolonged grinding before being applied to the support layer.

4. A method of manufacturing a granular filter membrane having an average surface roughness measured over a distance equal to at least five times an average grain size of said membrane that is less than one fifth of said average grain size in the region in question, wherein the method comprises preparing a thin slip consisting essentially of a suspension in a liquid vehicle of fine grains of an inorganic material selected from the group consisting of metal oxides, silicon carbide, silicon nitride, silicon and aluminum oxynitrides (SiALON), borides, and glasses, together with a dispersing agent in an amount sufficient to obtain a thoroughly deflocculated suspension of fine grains, and a thickening agent which does not hinder deflocculation;

depositing the slip onto a porous support layer having pores of greater size than said filter layer;

draining off excess slip so as to leave a thin uniform layer on the support;

drying the deposited thin layer; and then baking the support layer with the thin layer it is supporting at a temperature suitable for sintering the grains of the inorganic material.

5. A filter membrane including at least one filter layer having an exposed surface and being composed of a sintered inorganic material in the form of grains which are fixedly connected to one another, said inorganic material being selected from the group consisting of metal oxides, silicon carbide, silicon nitride, silicon and aluminum oxynitrides (SiALON), borides, and glasses, wherein the improvement comprises the filter layer having been formed by depositing onto a porous support layer a thin slip consisting essentially of a thoroughly deflocculated suspension of fine grains of said organic material in a liquid vehicle, together with a dispersing agent in an amount sufficient to obtain thorough deflocculation of said grains and a thickening agent which does not hinder deflocculation, the porous support layer having pores of greater size than said filter layer, draining off excess slip so as to leave a thin uniform layer on the support, and baking the filter membrane at a temperature sufficient to sinter the grains of the inorganic material, such that the average roughness of the surface of said sintered filter layer over a distance along said surface equal to at least five times the average grain size is less than one fifth of the average grain size in the region in question.

* * * * *